United States Patent [19]

Ohmura et al.

[11] Patent Number: 4,760,411

[45] Date of Patent: Jul. 26, 1988

[54] ELECTROSTATIC RECORDING APPARATUS

[75] Inventors: Atsuo Ohmura; Hiroyuki Honda; Masayuki Enomoto; Hisao Sato; Minoru Kawano, all of Hachioji, Japan

[73] Assignee: Konishiroku Photo Industry Co., Ltd., Tokyo, Japan

[21] Appl. No.: 893,086

[22] Filed: Aug. 1, 1986

[30] Foreign Application Priority Data

| | | | |
|---|---|---|---|
| Aug. 6, 1985 | [JP] | Japan | 60-172730 |
| Jan. 16, 1986 | [JP] | Japan | 61-7088 |
| Jan. 16, 1986 | [JP] | Japan | 61-7089 |
| Mar. 5, 1986 | [JP] | Japan | 61-46311 |

[51] Int. Cl.[4] .............................................. G01D 15/10

[52] U.S. Cl. .................................. 346/160.1; 346/150

[58] Field of Search ............................... 400/356, 114; 346/160.1, 145, 136, 150; 355/14 S H, 15

[56] References Cited

U.S. PATENT DOCUMENTS 4,545,668 10/1985 Zaitsu ............................ 355/14 SH

*Primary Examiner*—Arthur G. Evans

*Attorney, Agent, or Firm*—Jordan B. Bierman

[57] ABSTRACT

An electrostatic recording apparatus wherein a fixing device can be pulled out from a predetermined operating position, a transfer portion is separated from an image retainer and the pressure contact between a fixing roller and a press roller is released in operative connection with the operation of pulling out the fixing device.

11 Claims, 6 Drawing Sheets

ELECTROSTATIC RECORDING APPARATUS

BACKGROUND OF THE INVENTION

1. Field of the Invention:

This invention relates to an electrostatic recording apparatus which can accomplish drawing a fixing device, separation of a pressing roller from a fixing roller and separation of a transfer portion from an image retainer.

2. Description of the Prior Art:

Electrostatic recording apparatuses are extensively used as electronic reproducing machines, laser printers, LED printers and the like. An example of an electronic reproducing machine, namely, a reproducing apparatus, will be described hereinafter.

In the reproducing apparatus, a light from a light source is exposed to the original surface on a document glass plate, a reflected light from the original surface is illuminated on a photosensitive drum through a reflecting mirror to form an electrostatic latent image, which is developed by a developing portion, a toner image is then transferred onto a recording paper supplied timely, charge elimination and/or separation is effected and thereafter the recording paper is ejected through a fixing device. The transfer portion and the photosensitive drum, and the fixing roller within the fixing portion and the press roller used in such a reproducing apparatus as described may be released in pressure in order to facilitate a removal of a recording paper possibly jammed during a passage thereof. In the case of conventional reproducing apparatuses, a separation mechanism between the transfer portion and the photosensitive drum, for example, a separation mechanism between the photosensitive drum and a transporting portion is disclosed, for example, in Japanese Patent Application Laid-Open Nos. 77733/1977, 75444/1977 and 92745/1979 and Japanese Utility Model Application Laid-Open No. 108451/1980, according to which releasing mechanisms for the fixing roller within the fixing device and the pressing roller are separately provided, and therefore, the operation thereof was cumbersome and in addition, it was not possible to secure a large space used to clear the jamming.

Furthermore, a conventional fixing device of this kind has a handle adapted to move a fixing unit from a given position to a pull-out position and vice versa, and a lock-releasing lever for releasing a pawl provided to lock the fixing unit at the given position. Accordingly, when the fixing unit is moved from the given position to the pull-out position, two actions are needed, one for operating the lock releasing lever to disengage the pawl and the other for operating the handle, which leads to not only cumbersome in operation but also, in case of the aforesaid pawl, a certain play essentially required in a locking portion of the fixing unit where the pawl is locked in order to turn the pawl in a releasing direction, with the result that the fixing unit cannot be firmly secured to the given position and the position thereof becomes unstable, thus involving a problem that a deviation of transfer or the like is created.

Moreover, the fixing device for fixing a toner image transferred onto a recording paper normally comprises a pair of upper and lower press rollers, whereby a toner is molten by the pressure of the press rollers and heat applied to the rollers to fix the image. Therefore, the recording paper is apt to be jammed during such operation and a contamination of toner is liable to adhere. In view of the foregoing, the fixing unit is designed so that it may be pulled out in the ejecting direction of the recording paper to facilitate the operations such as the handling of jam, the cleaning of rollers and the like.

However, in the past, the pressing and releasing of the press rollers within the fixing unit have been done by a mechanism separately from the pull-out mechanism of the fixing unit, thus resulting in troublesome in operation.

In addition, the fixing device of an electrophotographic reproducing machine is interiorly provided with a fixing roller driven by a drive gear supported on the frame of the reproducing machine, and normally the shaft of the fixing roller has to be positively secured at a position where it is driven in such a manner that the aforesaid shaft is parallel to the shaft of the photosensitive drum in order to prevent occurrence of fixing creases and a deviation in position. Furthermore, in the event that jamming should occur, it would have to be moved temporarily from the fixing position. That is, it is desired that the fixing device be positively secured so that it may not be moved even if the fixing roller is driven by a drive gear and the fixing device may be easily unlocked.

SUMMARY OF THE INVENTION

This invention overcomes the above-described problems. It is an object of the invention to provide an electrostatic recording apparatus which is simple in structure whereby a single lever may be operated to effect pulling a fixing device outside the machine, releasing of a press roller from a fixing roller, and releasing of a transfer portion from a photosensitive drum as an image retainer.

For achieving the above-described object, in accordance with an embodiment of the present invention, there is provided an electrostatic recording apparatus having a fixing device provided thereon in such a manner that the device may be pulled out from a predetermined operating position, the apparatus being provided with an interlocking mechanism which separates a transfer portion from an image retainer in operative connection with the operation of pulling out the fixing device and releases pressure contact between a fixing roller and a press roller.

It is a further object of the invention to provide a fixing device in which a fixing unit can be firmly locked at its given position and the fixing unit can be pulled out in a direction of ejecting a recording paper by one action of a handle.

For achieving the aforesaid object, according to a further embodiment of the present invention, a turning lever for moving a fixing unit in a horizontal direction is supported on a handle shaft with a predetermined play in a turning direction, and a pawl capable of locking the fixing unit at its locking portion in a given position is supported rotatably following the handle shaft whereby the pawl may be unlocked without forming any play between the pawl and the locking portion at which the pawl is locked, and by the pulling out operation of the fixing unit, the pawl may be first disengaged and the fixing unit may then initiate its movement.

It is another object of the present invention to provide a fixing device in which when a fixing unit is pulled out, a roller is released during the movement thereof.

For achieving the aforesaid object, according to another embodiment of the present invention, there is provided a fixing device having a fixing unit provided thereon in such a manner that it may be pulled out in a direction of ejecting a recording paper, wherein roller within the fixing unit may be pressed or released during the movement of the fixing unit.

It is a still another object of the present invention to provide a position locking mechanism for a parallel displacing member which fulfills the aforementioned demands, in case of being used as a position locking mechanism for the fixing device.

For achieving the aforesaid object, according to an alternative embodiment of the present invention, there is provided a position locking mechanism for a displacing member, comprising a frame for guiding a displacing member, a displacing drive shaft supported on the frame, an operating member for rotating the drive shaft to left and right, and a lock member mounted on the drive shaft and capable of engaging the displacing member, wherein the drive shaft is rotated to left and right by the operating member to bring the displacing member into direct or indirect contact with the drive shaft to displace it in parallel from a locking position to a position away from the locking position specified by the lock member, characterized in that the lock member comes into engagement with the displacing member so as to receive a resultant force of a force applied to the displacing member at the locking position in its movable direction and a rotative force applied by driving a follower rotating means provided on the displacing member by a drive rotating means provided externally of the displacing member.

DESCRIPTION OF THE PREFERRED EMBODIMENTS

Figure 1:
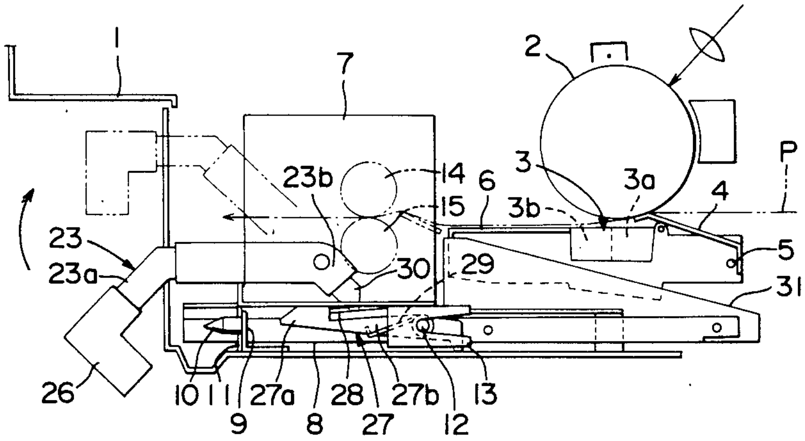
FIG. 1 is a sectional view showing a state wherein a fixing device is held at a given position.

The reference numeral 1 designates a reproducing apparatus body (hereinafter referred to as the body), 2 a photosensitive drum (an image retainer), 3 a transfer portion provided with a transfer pole 3a for transferring a tonor image formed on the photosensitive drum 2 onto a recording paper (not shown) and a separating pole 3*b*, and 4 a transport unit. The transfer portion 3 is supported on a movable frame 6 having a support point 5 at a downstream in a transporting direction of the recording paper relative to the photosensitive drum 2. The transport unit 4 is secured at the side of a base portion of the movable frame 6.

A fixing device indicated at 7, which fixes an image transferred onto the recording paper, is mounted through a slidable means 8 on the bottom of the body 1 so that the fixing device 7 may be pulled out in a direction of ejecting the recording paper (in a direction as indicated by the arrow). The fixing device 7 is determined in its given position by a suspension plate 11 having a through hole capable of being fitted into a locating pin 10 horizontally projected in a sliding direction of the fixing device 7 on a rising plate 9 secured to the bottom of the body 1, and a bifurcated side plate 13 engageable with a locating pin 12 provided opposedly of opposite side walls of the body 1.

The fixing device 7 comprises a fixing roller 14 and a press roller 15 opposed to the lower surface of the fixing roller 14, the press roller 15 having both ends of a support shaft 16 thereof supported by a press lever 18 through a bearing 17. The pressing lever 18 is pivotably mounted between side frames of the fixing device 7 through a shaft 19, and the press roller 15 is urged by means of a spring 20 in a direction of pressing the fixing roller 14.

Figure 4:
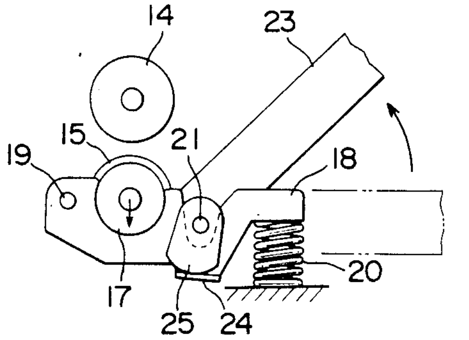
FIG. 4 is a side view wherein the press roller is released from the fixing roller by operation of a manual lever.

A shaft lever indicated at 21, which is inserted through a depression 22 at the upper edge of the press lever 18, has a manual lever 23 secured thereto, and has a cam 25 in sliding contact with a projection 24 provided on the press lever 18. The pivotal movement of the manual lever 23 in a direction of the arrow as shown by the two-dot chain lines in FIG. 1 by a handle 26 provided on the outer end of one end 23*a* extended toward the outside the body 1 causes the cam 25 to be rotated, and the press lever 18 may be moved downward as shown in FIG. 4 against the spring 20 by the long side of the cam 25. More specifically, the press roller 15 may be separated from the fixing roller 14.

Figure 2:
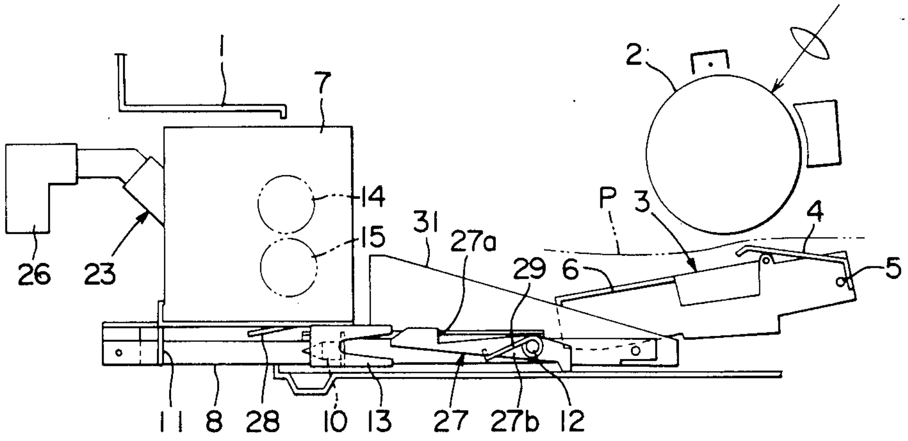
FIG. 2 is a sectional view wherein the fixing device is pulled out.
Figure 3:
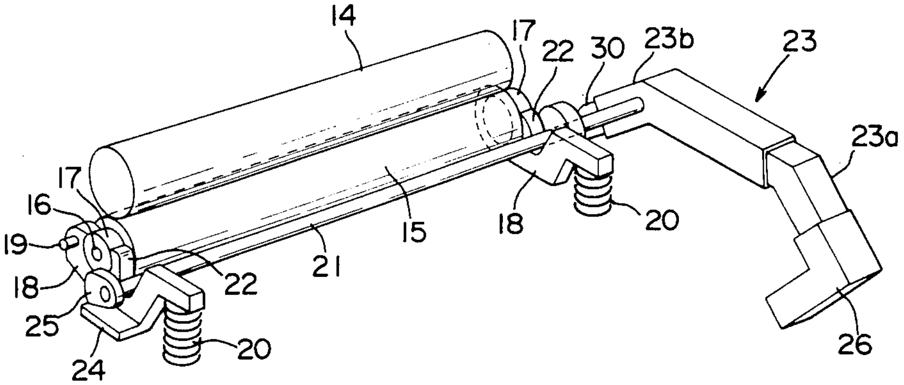
FIG. 3 is a perspective view showing a mechanism for pressing and releasing a fixing roller and a press roller.

A retaining means indicated at 27, which retains the fixing device 7 at its given position, is composed of a pivotal lever 27*b* having a hook 27*a* engaging a projection 28 provided on the lower surface of the fixing device 7. The pivotal lever 27*a* of the retaining means 27 is normally pivotally urged by the action of a spring 29 in a direction where the hook 27*a* engages the projection 28 but when the manual lever 28 is turned as described above, the hook 27*a* is disengaged by a projected element 30 provided on the other end 23*b* of the manual lever 23. Accordingly, if the manual lever 23 is pulled as shown in FIG. 2 while maintaining the above-described state, the fixing device 7 may be pulled out.

An inclined cam provided integral with the fixing device 7 is indicated at 31, and the inclination of the inclined cam 31 is higher at its front portion and lower at its rear portion with respect to the pulling direction of the fixing device 7. A free end of the movable frame 6 which supports the transfer portion 3 and the transport unit 4 is placed on the inclined cam 31. The movable frame 6 is held at the higher portion of the inclined cam 31 as shown in FIG. 1 when the fixing device 7 is encased at the given position to remain at the transfer position but when the fixing device 7 is pulled out, the free end thereof is moved down as the inclined cam 31 inclines as shown in FIG. 2. That is, the transfer portion 3 and the transport unit 4 may be separated from the photosensitive drum 2. The inclined cam can be substituted for a member such as link or chain moving with the fixing device so as to separate the transfer portion from the drum.

Description of the operation of the above-described embodiment will be made hereinafter.

In dealing with the jamming, when the handle 26 at the outer end of the manual lever 23 is raised upward, the shaft lever 21 is rotated, the press lever 18 is moved down against the spring 20 by the long side portion of the cam 25 secured to the shaft lever 21 to separate the press roller 15 from the fixing roller 14 and at the same time, the hook 27*a* of the retaining means 27 hving retained the fixing device 7 at the given position by the projected element 30 on the other end of the manual lever 23 is disengaged from the projection 28. When the manual lever 23 is pulled this side while being raised as mentioned above, the fixing device 7 is pulled out of the body 1 along the ejecting direction of the recording paper. The fixing device 7 is integrally provided with the inclined cam 31, and the free end of the movable frame 6 supporting the transfer portion 3 and the transport unit 4 is plced on the inclined cam 31, and therefore, the free end of the movable frame 6 is moved down the pull-out of the fixing device 7 to separate the transfer portion 3 and the transport unit 4 from the photosensitive drum 2. Thereby, a space between the photosensitive drum and the fixing device becomes increased to provide separations between the fixing roller and the press roller and between the photosensitive drum and the transfer portion and transport unit. At that time, in normal reproducing operation, a recording paper P is being transported as shown in FIG. 1, but in the event that the paper P becomes jammed during the transporting and the transport unit 4 is separated, the recording paper P may assume the state wherein it may be removed easily as shown in FIG. 2.

In order to return the fixing device 7 to its original position after the jamming has been cleared, if the manual lever 23 is returned to its original position, the press lever 18 having been depressed by the cam 25 is returned by the strength of stability of the spring 20 to press the press roller 15 against the fixing roller 14. Thereafter, if the fixing device 7 is pushed into the body 1, the through hole of the suspension plate 11 of the fixing device 7 and the bifurcated member 13 are brought into engagement with the locating pin 10 and the locating pin 12 in the side wall, respectively, to secure their given position and are completely retained on the body 1 by the action of the retaining means 27.

This invention is not limited to the above-described embodiment but it is to be noted that for example, the fixing roller may be separated by the provision of a grooved cam or a cam surface provided in a pulling out direction by the operation of pulling the fixing device 7 outwardly. In addition, a well known click mechanism or a locking and releasing mechanism by a push button can be used instead of using a stop mechanism by the manual lever. While the manual lever 23 has been provided projected outwardly of the body 1, it will be of course noted that for example, a front cover (not shown) of the reproducing apparatus 1 is opened and the fixing device and transport portion may be pulled outwardly by the manual lever provided within the body.

As described above, the electrostatic recording apparatus having a fixing device provided so as to be pulled out from a predetermined operating position is characterized by the provision of an interlocking mechanism for moving a transport portion from an image retainer in operative connection with the operation of pulling out the fixing device and releasing the pressing between the fixing roller and the press roller. Therefore, by the single operation of the manual lever, it becomes possible to provide pressing and releasing of the fixing device, movement of the fixing device, and separation of the transfer portion from the photosensitive drum to secure an extensive space for dealing with the jamming.

Furthermore, since the rollers are released at the same time when the fixing device is pulled outside, cleaning, exchanging and repairing of rollers may be easily accomplished, and various other effects may be obtained.

Figure 5:
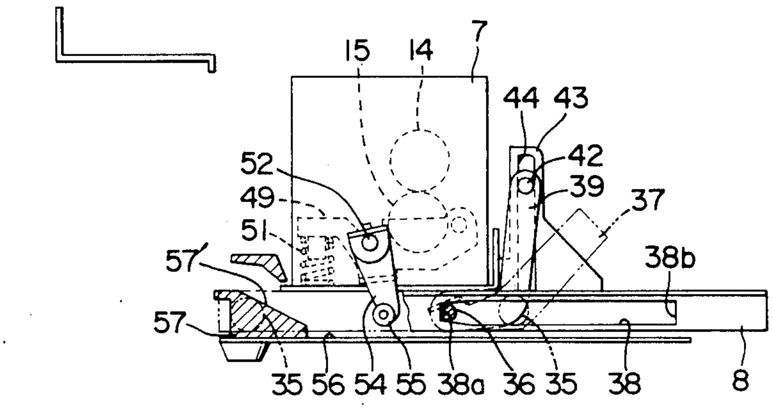
FIG. 5 is a sectional view showing a state wherein a fixing unit is locked at its given position.
Figure 6:
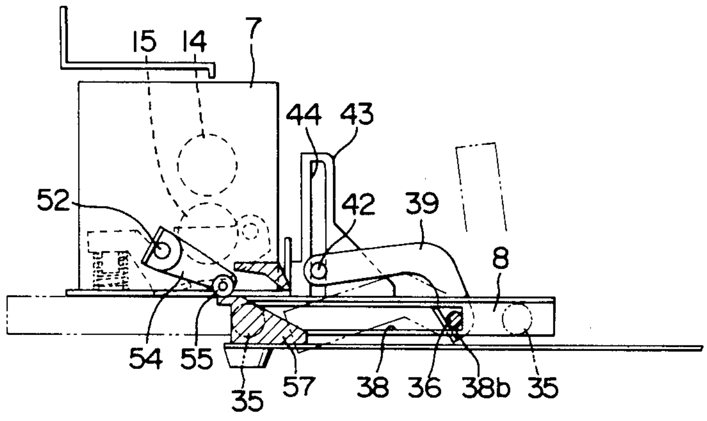
FIG. 6 is a sectional view showing a state wherein the fixing unit is pulled out.
Figure 7:
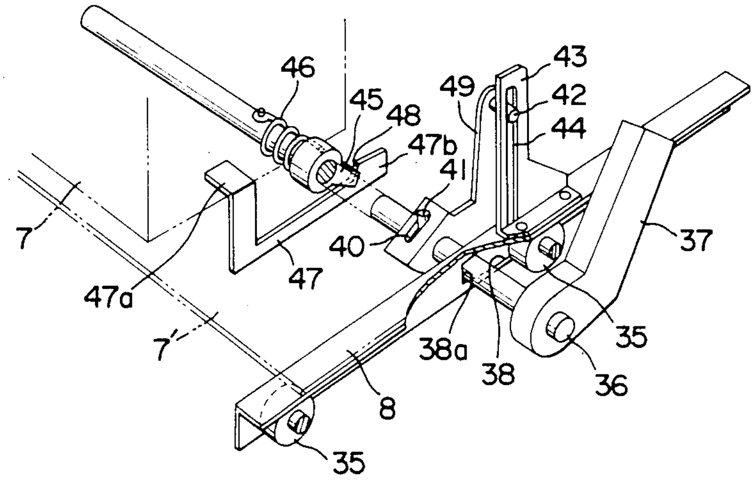
FIG. 7 is a perspective view of essential parts.

In the following, a further embodiment of the present invention will be described by reference to FIGS. 5 through 9. A fixing unit 7 may be pulled in the ejecting direction of the recording paper on a rotary wheel 35 supported on a frame work (not shown) of the body through a sliding member 8 secured to the lower surface of both ends of a mounting base plate 7' of the unit 7. A handle shaft indicated at 36, which is rotatably supported on the frame work and having a handle 37 secured to the outer end thereof, is inserted into a slot 38 formed in the sliding direction on a side frame of the sliding member 8. When the fixing unit 7 is in the given position as shown in FIG. 5, the slot 38 abuts at its left end 38*a* against the handle shaft 36, and when the fixing unit 7 is in the pulled out position as shown in FIG. 6, the slot 38 abuts at its right end 38b against the handle shaft 36. In other words, the left end 38*a* of the slot 38 determines the given position of the fixing unit 7, and the right end 38*b* thereof likewise controls the maximum pull-out position of the fixing unit.

A pivotal lever indicated at 39, which is fitted at its gase end into the handle shaft 36, causes a slot 40 provided in a pivotal direction on the base end thereof to be engaged by a pin 41 projected from the handle shaft 36. The handle shaft 36 has a certain play so that the pivotal lever 39 may be pivotally moved slightly later than the initiation of the pivotal movement of the handle shaft 36.

A roller indicated at 42 supported at the side of the pivotal end 39*a* of the pivotal lever 39, is slidably fitted at the side of an upper level of a longitudinal elongated groove 44 provided in a frame 43 stood upright on the upper surface of the sliding member 8. Accordingly, when the pivotal lever 39 is pivotally moved leftword by the hand shaft 36, the frame 43 provided with the longitudinal elongated groove 44 fitted in the roller 42 is pressed leftward by the roller 42 to cause the sliding member 8 integral with the frame 43 and the fixing unit 7 to be moved in the pull-out direction.

A pawl indicated at 45, which is loosely fitted in the handle shaft 36, is secured to the other end of a coil spring 46 having its one end secured to the handle shaft 36. When the fixing unit 7 is in the given position, the foremost end of the pawl 45 is held rightwardly, obliquely and downwardly by the coil spring 46, and when the handle shaft 36 is rotated, the pawl is rotated following the shaft 36 through the coil spring 46.

The reference numeral 47 designates an L-shaped member having a base end 47*a* secured to the lower surface of the fixing unit 7 (in the illustrated embodiment, to the lower surfce of the base plate 7') and a foremost end 47*b* horizontally extended in a direction opposite the pull-out direction of the fixing unit 7. The upper edge of the foremost end 47*b* of the L-shaped member 47 is rised engaging portion 48 with which the foremost end of the pawl 45 engages when the fixing unit 7 is in the given position. This engaging portion 48 is formed in the inner edge side of the rised portion so as to be rightwardly and upwardly inclined (a receiving inclined surface), upon which the foremost end of the pawl directed rightwardly, obliquely and downwardly as previously mentioned impinges. Thus, even if the pawl 45 impinges upon the engaging portion without any play, if it is turned leftward by the handle shaft 36, the pawl 45 may be turned freely but even if the pawl 45 presses the fixing unit 7 in the pull-out direction in the state wherein the pawl 45 impinges upon the engaging portion 48, the pawl 45 is positively locked by the toggle action thereof. Moreover, when the pawl 45 causes the fixing unit 7 to be returned to the given position from the pulled-out position, if the raised portion provided on the foremost end of the L-shaped member 47 impinges thereupon, the pawl 45 is turned leftward against the coil spring 46, slips on the rised portion, is fallen by the repulsion of the spring 46 into the engaging portion 48 provided on the inner edge side thereof, and engages at the inclined portion in a stretched fashion. Preferably, the falling of the pawl 45 from the rised portion to the engaging portion 48 is made slightly earlier than the abutment and stopping of the left end 38a of the slot 38 of the sliding member 8 placed on the fixing unit 7 against the handle shaft 36 so that the foremost end of the pawl 45 impinges at the middle portion of an inclined area of the engaging portion 48. However, such adjustment need not be done excessively strictly. Because the lock performance remains unchanged as long as the foremost end of the pawl 45 impinges upon any position of the inclined area of the engaging portion 48.

Figure 8:
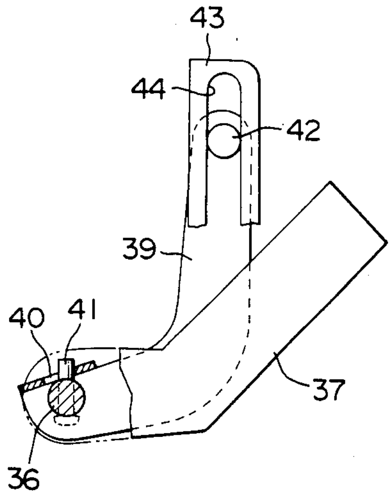
FIGS. 8 (A) and 8 (B) are respectively explanatory views showing the relationship between a handle, a handle shaft and a turning lever.
Figure 8:
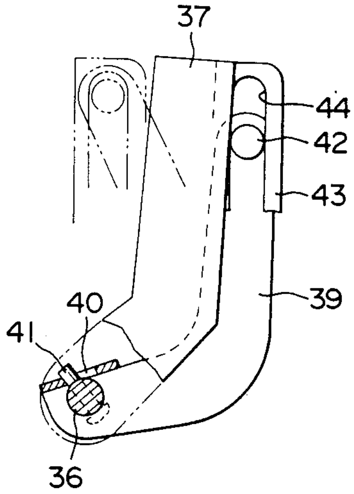
Figure 9:
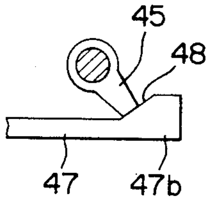
FIGS. 9 (A) and 9 (B) are respectively explanatory views showing the relationship between a pawl and a locking portion thereof.
Figure 9:
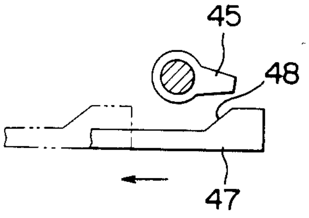

In the above-described embodiment, the fixing unit 7 may be pulled from the given position to the pull-out position for dealing with the jamming or the like by one action which merely comprises turning the handle 37 in the state as shown in FIG. 8 (A) in a leftward direction. More specifically, when the handle is operated to rotate the handle shaft 36, the pivotal lever 39 engaged with the pin 40 of the handle shaft 36 through the slot 41 is free relative to the handle shaft 36 till the pin 40 engages the end of the slot 41 as shown in FIG. 8 (B) but during that period, the pawl 45 having been impinged upon the engaging portion 48 provided on the fixing unit 7 as shown in FIG. 9 (A) to lock the fixing unit 7 at the given position follows and rotates, as a consequence of which it is unlocked, and therefter the pivotal lever 39 starts its rotation integral with the handle shaft 36. Thereby the roller 42 supported at the side of the pivotal end 39a of the pivotal lever 39 causes the fixing unit 7 to be moved in the pull-out direction while being slidably moved within the longitudinal elongated groove 44 of the frame 43 stood upright on the upper surfce of the sliding member 8.

When the handle 37 is turned in the direction opposite that of the former after the necessary dispositions in the pulled-out position of the fixing unit 7, the pawl 45 rotates following the handle shaft 36 to cause the fixing unit 7 to be moved rightward later than that through a play portion. Then when the foremost end of the pawl 45 is rightwardly, obliquely and downwardly directed, the rised portion of the foremost end of the L-shaped member 47 causes the pawl 45 to be pushed upward against the spring 46, and therefore, the pawl 45 slips on the rised portion, is fallen onto the engaging portion 48 provided at the inner edge side thereof by the repulsion of the spring 46, and may be engaged by the inclined area thereof in a stretched fashion, namely, without a play to positively lock the fixing unit 7 at the given position thereof.

As described above, the present invention is characterized in that the pivotal lever for moving the fixing unit in a horizontal direction is supported on the handle shaft in a pivotal direction with a predetermined play, and the pawl which can lock the fixing unit at its engaging portion in the given position is supported rotatably following the handle shaft. Therefore, the fixing unit may be locked between the pawl and the engaging portion of the fixing unit at which the former engages without formation of any play, the fixing unit may be firmly locked at its given position, and one action of the handle first causes the pawl to be disengaged and then the fixing unit to initiate its movement, thus rendering the operation simple, which is an excellent effect exhibited by the invention.

Description of another embodiment according to the present invention will be made by reference to FIGS. 11 and 12.

Figure 10:
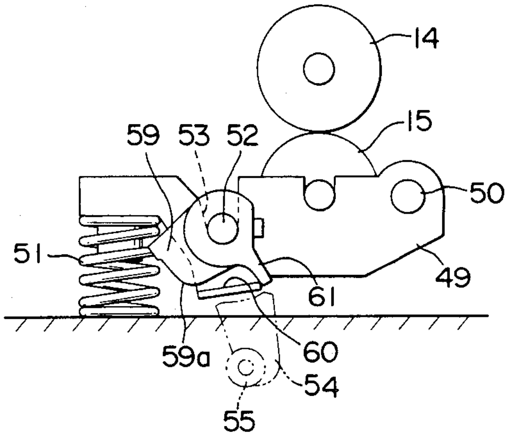
FIG. 10 is a view showing the relationship between an eccentric cam and a pivotal lever when the roller is pressed.
Figure 11:
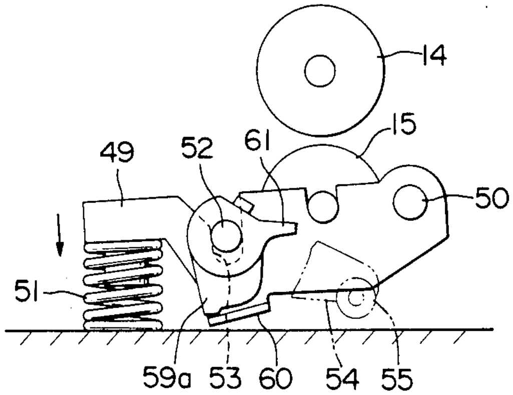
FIG. 11 is a view showing the relationship between an eccentric cam and a pivotal lever when the roller is released.

A bearing member indicated at 49, which rotatably supports thereon a press roller 15 provided within the fixing unit 7 as shown in FIGS. 10 and 11, has its base end rotatably mounted on a support shaft 5 provided on a side frame of the fixing unit 7, and has a foremost end pushed up by means of a spring 51 placed in contact with the bottom surface of the fixing unit 7 to press the press roller 15 against the fixing roller 14. A pivotal shaft 52 is supported between side frames of the fixing unit 7 so as to be inserted into a recess 53 provided on the upper edge close to the foremost end of the bearing member 49, and a pivotal lever 54 supported on a roller 55 at the lower portion thereof is secured to the outer end of the pivotal shaft 52. The pivotal lever 54 is pivotally moved leftward against a spring not shown by means of a roller 55 fitted into an inclined cam groove 57' of a fixed cam 57 provided on a floor surface 56 when the fixing unit 7 is moved to the pull-out position to rotate the pivotal shaft 52 in the same direction as that of the former. An eccentric cam indicated at 59, which is secured to the pivotal shaft 52, downwardly presses a horizontal projection 60 provided on the lower edge side close to the foremost end of the bearing member 49 by its larger diameter portion 59*a* against a spring 51 when the pivotal shaft 52 is rotated leftward to press or release the press roller 15 supported on the bearing member 49 from the fixing roller 14. A stopper indicated at 61, which is secured to the pivotal shaft 52, is brought into abutment with the horizontal projection 60 to control the maximum rightward rotational position of the pivotal shaft 52.

In the above-described embodiment, when the handle 37 is turned leftwrad to rotate the handle shaft 36, the pawl 45 having been engaged by the engaging portion 48 provided on the foremost end of the L-shaped member 47 provided on the lower surface of the fixing unit 7 follows the rotation of the handle shaft 36 for rotation and is disengaged, and the pivotal lever 39 and the handle shaft 36 are rotated together to move the fixing unit 7 leftward.

Then, when the fixing unit 7 reached the pull-out position as shown in FIG. 6, the roller 55 provided on the lower end of the pivotal lever 54 is fitted into the inclined cam groove 57′ of the fixed cam 57 provided on the floor surface 56 of the body with the result that the pivotal lever 54 is pivotally moved leftward to rotate the pivotal shaft 52 in the same direction as that of the former. By the rotation of the pivotal shaft 52, the large diameter portion 59*a* of the eccentric cam 59 secured thereto downwardly presses the horizontal projection 60 provided on the lower edge side close to the foremost end of the bearing member 59 against the spring 51, and therefore the press roller 15 supported on the bearing member 49 is released in pressure from the fixing roller 14 as shown in FIG. 11. Accordingly, the disposition of the jamming may be accomplished in a simple manner.

In order to return the fixing unit 7 to its original state after the jamming has been cleared, the handle 37 may be rotated in the direction opposite to that as previously mentioned, whereby the fixing unit is moved rightward and the pivotal lever 54 is pivotally moved rightward since the roller 55 provided on the lower end thereof is escaped from a high level of the inclined cam groove 57′ of the fixed cam 57 installed on the floor surface 56 of the body. Therefore, the eccentric cam 59 is allowed to escape from the horizontal projection 60 of the bearing member 49 through the pivotal shaft 52. Thus, the bearing member 49 is again rotated by the resilient force of the spring 51 in the direction wherein the pressing roller 15 is pressed against the fixing roller 14, and in the state wherein the fixing unit is returned to the given position as shown in FIG. 5, the roller is returned to assume the pressing state.

As described above, according to the above embodiment, there is provided the fixing device capable of pulling out the fixing unit in the ejecting direction of the recording paper characterized in that the press roller within the fixing unit may be released in pressure during the movement of the fixing unit. Therefore, between the rollers may be released at the same time when the fixing unit is pulled out to the pull-out position by the operation of the handle, thus providing an excellent effect in that removing of a recording paper jammed between the rollers, cleaning, replacing and repairing rollers may be made simply.

Description of another embodiment of the present invention will be made hereinafter.

Figure 12:
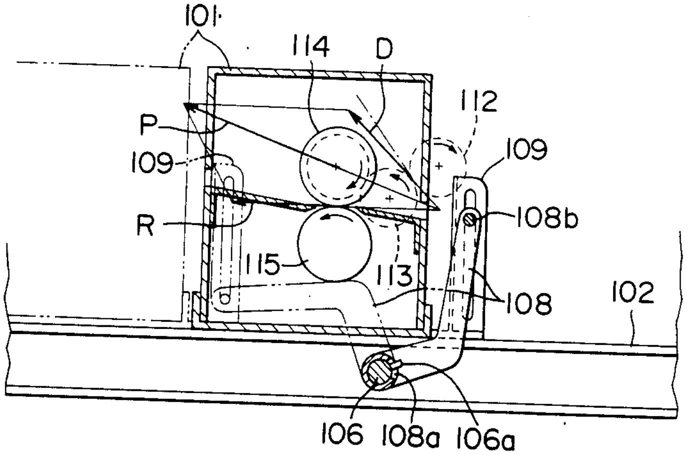
FIG. 12 is a side view of a parallel displacing mechanism showing one example where the present invention is applied to a position locking mechanism of a fixing unit.
Figure 13:
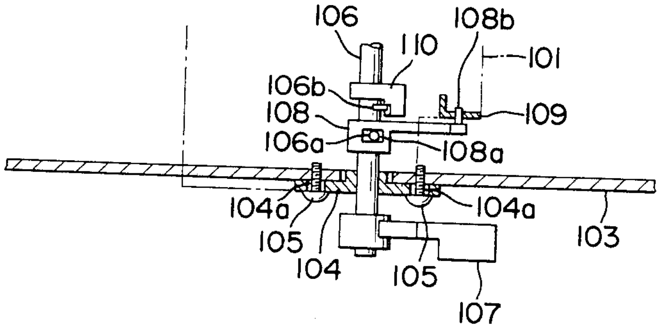
FIG. 13 is a plan view.
Figure 14:
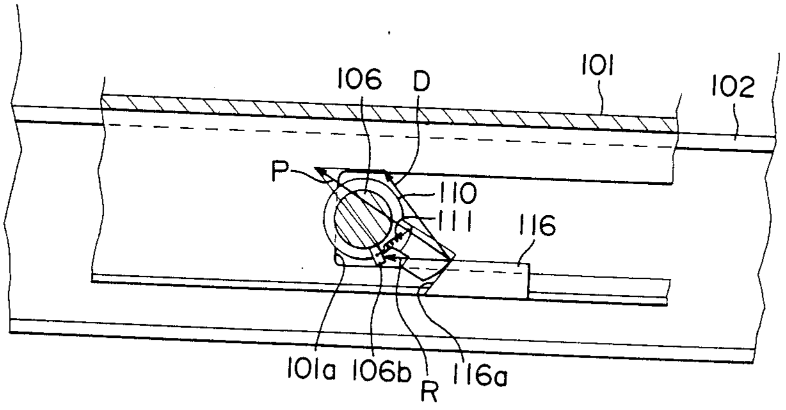
FIG. 14 is a side view of the position locking mechanism.

FIG. 12 is a side view of a parallel displacing mechanism showing an example wherein the present invention is applied to a position locking mechanism device; FIG. 13 is a plan view of the same; and FIG. 14 is a side view of the position locking mechanism.

Referring to the drawings, the reference numeral 101 designates a fixing device which is a parallel displacing member, 102, 103 left and right frames for guiding the fixing device 101, 104 bearings mounted on the left and right frames 102 and 103 by screw 105, 106 a displacing drive shaft supported by the bearing 104, 107 an operating handle integral with the displacing drive shaft 106, 108 a crank arm rotated in response to the rotation of the displacing drive shaft 106 by engagement between a pin 106*a* provided on the displacing drive shaft 106 and a circumferential slot 108*a* provided in a boss loosely fitted in the displacing drive shaft 106, 109 a slider link provided integral with the fixing device 101 and having a slider groove to be engaged by a crank pin 108*b* of the crank arm 108, 110 a lock member loosely fitted in the displacing drive shaft 106 and coming into contact with a pin 106*b* provided on the displacing drive shaft 106 by the action of a spring 111 retained between the lock member and the pin 106*b*, and 112 a drive gear supported on the frame 102 or 103 and adapted to rotate a pair of fixing rollers 114, 115 through a carrier gear 113 of the fixing device 101.

In the illustrated state, the fixing device 101 becomes locked at the fixing position. That is, the operating handle 107 is fallen to the right and at the same time the displacing drive shaft 106 is rotated rightward, and the crank arm 108 is turned to the right by the engagement between the pin 106*a* and the slot 108*a* whereby the slider link 109 and the fixing device 101 are moved rightward till an abutment surface 101*a* provided on the lower suspension wall of the fixing device 101 abuts against the displacing drive shaft 106, and the lock member 110 is turned to the right while being pulled by the spring 111, which foremost end comes into engagement with a lock surface 116a of a cam portion 116 provided on the lower suspension wall of the fixing device 101 as shown in FIG. 14 so that the fixing device 101 assumes the state wherein its position is locked.

The foremost end surface of the lock member 110 and the lock surface 116a of the cam portion 116 are formed to have a configuration in which they are engaged each other by change of a rightward pivotal angle drawn by the spring 111 of the lock member 110 even if there is a slight error in clearance between the abutment surface 101*a* provided on the suspension wall of the fixing device 101 and the lock surface 116a. In addition, the foremost end surface of the lock member 110 and the lock surface 116*a* of the cam portion 116 are formed so that when a force D for pushing the carrier gear 113 of the drive gear 112 and where for example, the parallel displacing member comprises a stretching roller unit of a film, a reaction of the film to be stretched are applied as a force R in a direction of moving the displacing member 101 to the rollers 114 and 115, the normal direction of engagement takes a substantially parallel direction to the direction of a resultant force P with the force R and the lock member 110 receives the resultant force P. With this, the fixing device 101 and the parallel displacing member such as a stretching roller unit can be positively prevented from the elevation and creation of a play such as a deviation from the locked position toward the guiding direction even if the rollers 114 and 115 are driven by the drive gear 112 while being locked in position by the lock member 110.

In the event the jam of a transfer paper should occur before and behind the fixing device 101, the operating handle 107 may be operated so as to be falled leftward. Thereby, the displacing drive shaft 106 is rotated leftward so that the pin 106*b* comes into abutment with the lock member 110 to turn the lock member 110 leftward to release the engagement thereof with the cam 116, at which stage the pin 106*a* abuts against the slot 108*a* to turn the crank arm 108 leftward. Therefore, the slider link 109 and the fixing device 101 may be moved leftward till the crank pin 108b abuts against the bottom of the slider groove of the slider link 109, without being impeded by the lock member 110 and the pin 106*b*. The positions of the crank arm 108, the slider link 109 and the fixing device 101 shown by the two-dot broken lines in FIG. 12 indicate the aforementioned moved state. Under this state, the engagement between the drive gear 112 and the carrier gear 113 is released so that the fixing rollers 114 and 115 may be rotated easily in either left or right direction, and since the fixing device 101 is distanced from the righthand photosensitive drum not shown, it is possible to remove the jammed paper in a simple manner.

In order to return the fixing device 101 from the above-described moved state to the aforementioned fixing position, when the operating handle 107 is fallen to the right, the displacing drive shaft 106 and the crank arm 108 following the drive shaft 106 are rotated rightward, and accordingly the fixing device 101 is moved rightward so that the cam 116 thereof comes into abutment with the lock member 110. However, the lock member 110 is escaped toward the upper surface of the cam 116 by the action of the spring 111, and therefore the returning movement of the fixing device 101 to the fixing position is not impeded by the lock member 110. It is to be noted of course that the pin 106*b* is provided at a position and in length so as not to contact with the cam 116.

The shown lock mechanism and slider crank mechanism adapted to lock the fixing device 101 at the fixing position and to move it from the fixing position may be provided at one location of the displacing drive shaft 106 since the movement of the fixing device 101 is carried out by being guided by the left and right frames 102 and 103. It is preferred however that the aforesaid mechanisms are provided on two or opposite locations of the displacing drive shaft 106 in order that locking is positively made so as to parallel with the displacing drive shaft 106 and parallel movement in the direction perpendicular to the displacing drive shaft 106 is also carried out smoothly.

In the shown position locking mechanism, a hole 104*a* through which a mounting screw 105 for the bearing 104 mounted on one frame 103 is formed in a slot in a direction where the fixing device 101 moves so that even if the best fixing position of the fixing device 101 should be inclined relative to the shaft of the photosensitive drum, the fixing device 101 may be locked at the best fixing position. More specifically, the screw 105 of the bearing 104 is untightened to deviate the bearing 104 laterally in the range of the slot 104*a* whereby the fixing position at which the fixing device 101 is locked may be simply fixed and set at the best position not to create fixing creases or deviation in position of toner. Since this best position may be obtained in the range of a minute inclination with respect to the shaft of the photosensitive drum, even if the mounting position of the bearing 104 is displaced as mentioned above, it hardly occurs that the displacing drive shaft 106 is strained by the bearing 104 to make it difficult to effect the rotating operation. It is to be noted alternatively that a rubber sheet or the like can be interposed between the bearing 104 and the frame 102 to avoid an occurrence of a strain between the bearing 104 and the displacing drive shaft 106.

While in the foregoing, the present invention has been described by way of an example in which the invention is applied to the position locking mechanism, the present invention is not limited thereto but the parallel displacing member can be, for example, a stretching roller unit as has been mentioned previously. In addition, the moving mechanism for the parallel displacing member may includes a rack-and-pinion mechanism or the like other than the slider crank mechanism. The lock mechanism is not limited to the illustrated mechanism in which the lock member has a toggle cam, but may include one wherein a lock member has a hook which is engaged by a pin or a hole provided in a parallel displacing member, and a normal direction of engagement therebetween is parallel to a direction of a force applied to the parallel displacing member and the lock member receives that force.

According to the present invention, even if the rotary body of the parallel displacing member is driven, the parallel displacing member may be firmly locked at a predetermined position, and the locking may be easily released and displaced so as to separate it from the locked position.

What is claimed is:

1. In an electrostatic recording apparatus comprising;
- an image retainer, means for forming a latent electrostatic image on said image retainer, means for developing said latent electrostatic image, means for transferrring the developed image on said image retainer to a recording paper, and means for separating the recording paper,
- wherein said transferring means and said separation means form a transferring unit for fixing the image to said recording paper, said transferring unit comprising a fixing roller and a pressure roller,
- the improvement which comprises means for withdrawing the fixing means from th electrostatic recording apparatus along a paper path and means for interlocking the fixing means with the transferring unit to displace said transferring unit apart from said image retainer when said fixing means is withdrawn.

2. The fixing device as set forth in claim 1 further comprising a member which is moved interlocking with said fixing device, wherein said transfer portion is separated from the image retainer according to the motion of said member.

3. The fixing device as set forth in claim 2, wherein said member is a cam.

4. A fixing device characterized in that a pivotal lever for moving a fixing unit in a horizontal direction is supported on a handle shaft with a predetermined play in a pivotal direction, and a pawl capable of locking the fixing unit at its locking portion in a given position is supported rotatably following the handle shaft.

5. The fixing device as set forth in claim 2, wherein an engaging portion of the fixing unit with which the foremost end of said pawl engages comprises a receiving oblique surface.

6. In a fixing device wherein a fixing unit is provided in such a manner that the unit may be pulled out in a direction of ejecting a recording paper, the improvement characterized in that a roller within the fixing unit may be pressed or rleased during the movement of the fixing unit.

7. A position fixing device for a displacing member, comprising a frame for guiding the displacing member, a displacing drive shaft supported on the frame, an operating member for rotating the drive shaft to left and right, and a lock member mounted on the drive shaft and capable of engaging the displacing member, wherein the drive shaft is rotated to left and right by the operating member to bring the displacing member into direct or indirect contact with the drive shaft to displace it in parallel from a fixing position to a position away from the fixing position specified by the lock member, characterized in that the lock member comes into engagement with the displacing member so as to receive a resultant force of a force applied to the displacing member at the fixing position in its movable direction and a rotative force applied by driving a follower rotating means provided on the displacing member by a drive rotating means provided externally of the displacing member.

8. The position fixing device for the parallel displacing member as set forth in claim 5, wherein said lock member engages the displacing member on a toggle cam surface to fix the position of the displacing member.

9. The position fixing device for the parallel displacing member as set forth in claim 5 wherein said displacing member comprises a fixing device having a fixing roller.

10. The position fixing device for the parallel displacing member as set forth in claim 6 wherein said displacing member comprises a fixing device having a fixing roller.

11. The fixing device as set forth in claim 1, further comprising means for releasing the fixing roller and the pressure roller when the fixing means is withdrawn.

* * * * *